Jan. 17, 1939. LE ROY S. DUNHAM 2,144,218
ENGINE SHAFT MAGNETO
Filed Nov. 6, 1937 6 Sheets-Sheet 1

INVENTOR.
LeRoy S. Dunham
BY A. D. T. Libby
ATTORNEY

Jan. 17, 1939.  LE ROY S. DUNHAM  2,144,218
ENGINE SHAFT MAGNETO
Filed Nov. 6, 1937   6 Sheets-Sheet 2

INVENTOR
Le Roy S. Dunham.
BY
A. D. T. Libby
ATTORNEY

Jan. 17, 1939.　　LE ROY S. DUNHAM　　2,144,218
ENGINE SHAFT MAGNETO
Filed Nov. 6, 1937　　6 Sheets-Sheet 3

INVENTOR
Le Roy S. Dunham
BY
ATTORNEY

Jan. 17, 1939.　　　LE ROY S. DUNHAM　　　2,144,218
ENGINE SHAFT MAGNETO
Filed Nov. 6, 1937　　　6 Sheets-Sheet 4

INVENTOR.
Le Roy S. Dunham.
BY
A. D. T. Libby
ATTORNEY

Jan. 17, 1939.  LE ROY S. DUNHAM  2,144,218
ENGINE SHAFT MAGNETO
Filed Nov. 6, 1937  6 Sheets-Sheet 5

INVENTOR
Le Roy S. Dunham
BY
A. D. T. Libby
ATTORNEY

Patented Jan. 17, 1939

2,144,218

UNITED STATES PATENT OFFICE 2,144,218

ENGINE SHAFT MAGNETO

Le Roy S. Dunham, East Orange, N. J., assignor to Edison-Splitdorf Corporation, West Orange, N. J., a corporation of New Jersey Application November 6, 1937, Serial No. 173,125

17 Claims. (Cl. 171—209)

This invention relates to an ignition apparatus which is especially adapted for use in connection with an engine of the outboard type, although from the description which is to follow, it will be clearly seen that the ignition apparatus is applicable to most any style of engine, either of the vertical or horizontal type.

When the fundamental features of my invention are applied to an engine of the outboard type, it will be hereinafter referred to as a flywheel magneto.

In outboard motors it has been the custom in the past to start these by means of a rope adapted to be wound around the upper portion of the exposed flywheel, a flange being arranged on the outer surface of the flywheel to position the pull-rope. On some of the latest types of outboard motors, the pull-rope and flywheel are covered by a protecting casing, and instead of the pull-rope being entirely disengaged from the flywheel as in the first instance, it is automatically disengaged from the flywheel without coming out of the housing, apparatus being provided for automatically recoiling the rope for another pull, should the engine fail to start.

It has been my experience that all of these types of engines are very hard to start, even when equipped with a preliminary priming device as is sometimes incorporated in present-day motors.

A few of the reasons for this hard starting may be mentioned as follows:

Primarily, most outboard motors are of the two-cycle type which are generally inherently harder to start than a four-cycle engine. Because of the generally small size of outboard motors, the carbureters furnished must be necessarily small, and in fact, they are hardly more than mixing valves so that it is difficult to get a suitable mixture into the engine at the time of cranking. The outboard engine being placed, as it is, up on the stern of the boat, it is not in any too good position to be cranked with a pull-rope. Furthermore, the propeller of the engine being in the water, makes a dead load on the engine while it is being cranked, thereby making it difficult to turn the flywheel magneto fast enough to produce a spark sufficiently hot to ignite the poor mixture which is always present.

Therefore, the principal object of my invention to overcome the difficulties as far as the ignition is concerned, is to provide an ignition structure which, in combination with any type of engine to which it may be applied, and particularly the outboard motor type, will produce a good hot spark, irrespective of the degree of slowness with which the driving or operating power may be applied to the ignition apparatus.

In attaining the principal object, together with other ancillary objects which will appear from the description that follows, I have incorporated in the magneto structure an impulsing coupling in what I believe to be a new and novel manner, in that one element thereof comprises what may be termed a floating rotor system composed of a sleeve which is adapted to be placed on over one end of the engine shaft, such as the upper end of the crank shaft of an outboard motor, or over the crank shaft, cam shaft or some other suitable shaft of a horizontal engine, either of the two or four-cycle type.

On this sleeve is mounted a permanent magnet having the desired number of pole faces and the driven member of an impulse coupling unit, together with either a cam for operating the circuit breaker controlling the ignition coil, or a gear for operating an auxiliary rotary member such as a distributing mechanism, or a remotely located cam, or both, especially when the apparatus is for a multi-cylinder engine. These differences in arrangement of the floating rotor system will be hereinafter pointed out more in detail. The other element or driving member of the impulse coupling is fastened directly to the shaft on which the floating rotor system is mounted.

By this general arrangement it will be seen that when the invention is applied to an outboard motor or flywheel type of magneto, the part that is impulsed is the sleeve carrying a small permanent magnet, and the circuit-breaking cam and driven member of the impulse coupling, the entire unit being relatively small and of little inertia so that it is impulsed at a speed which will produce a good hot spark from the magneto ignition coil. This construction entirely eliminates the pull-rope and associated mechanism, so that the flywheel need only be provided with a knob or handle to merely turn it sufficiently to cause the impulsing apparatus to function, it being understood that a full charge has been gotten into the engine either by a primer or by oscillating the flywheel as is now the custom in outboard motors. Where there is a desire to retain a rope to start, the action is simple and easy since no actual spinning of the whole engine and propeller is required. Where the apparatus is applied to other engines it is manifestly advantageous thus to be able to secure a strong starting spark without having to turn the whole moving system of the engine at a rapid speed.

The drawings which accompany the following specification are not to be taken as preferred forms but merely to illustrate various ways in which the invention may be applied in practice.

Figures 1 to 11 inclusive illustrate the application of my invention to an engine constructed for outboard motor use. In the application of my invention to an outboard motor, 1 illustrates a bearing for the engine shaft on the upper end of which is fastened a flywheel 2 which also acts as a cover for enclosing the parts mounted below it. To the flywheel 2 is fastened a driving member 3 which forms one portion of an impulse coupling, the driving spring being indicated at 4. The flywheel 2 is fastened to the driving member 3 in any satisfactory manner as by screws and lock washers 5, and both are fastened to the engine shaft 6 by a key 7 and nut and lock washer 8.

Figure 2:
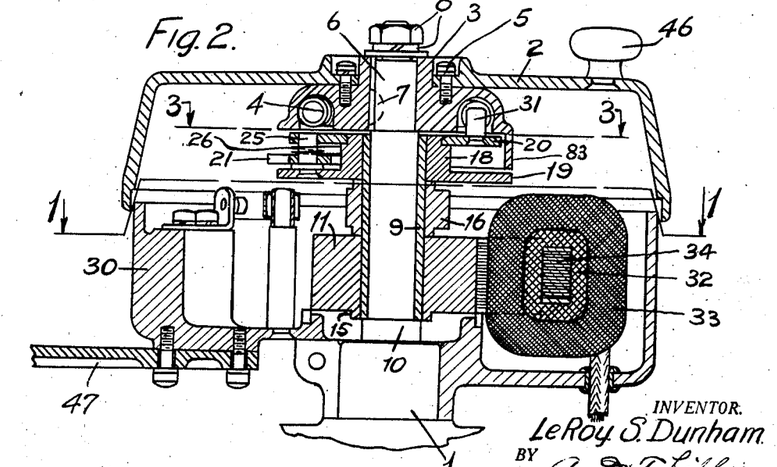
Figure 2 is a sectional view on the line 2—2 of Figure 1.

Mounted on the shaft 6 below the driving member 3 is a sleeve 9 which rests on a shoulder 10 on the shaft 6. Mounted on the lower end of the sleeve 9 is a permanent magnet 11 which is preferably constructed of material such as shown and described in Patent 2,081,800, issued May 25, 1937. The lower surface 12 of the magnet 11 is provided with a pair of spaced transverse projections 13 which act as keys which fit against the sides 14—14 which have been milled on a collar 15 which is integral with the lower end of the sleeve 9 and rests on the angular shoulder 10 of the shaft 6. Above the magnet 11 is mounted a cam 16 which has a driving connection with a projection 17 having parallel sides similar to the sides 14 shown in Figure 5, to be engaged by projecting keys 13, the same as on the magnet 11. The upper surface of the cam 16 is provided with a projection exactly similar to the projection 17 on the magnet 11, and this cooperates with projecting keys 13 on the impulse starter driven member 18 which has an annular flange 19 preferably integral therewith, and a plate or disc 20 which is permanently fastened thereto after the flyweights 21 and 22 have been mounted in position between the disc and flange 19 and 20. The flyweights 21 and 22 are pivoted at 23 and 24 respectively on the bottom flange 19 and have outboard bearings 25 in the upper plate 20. The flyweights 21 and 22 are normally held by springs 26 in impulsing position; that is, in a position to engage a stop member 27 preferably in the form of a roller mounted on a fixed stud 28 carried in some part 29 of the lower housing portion 30. To the plate 20 is fastened a stud 31 which acts to compress the impulse spring 4 at the time of starting the engine.

Figure 1:
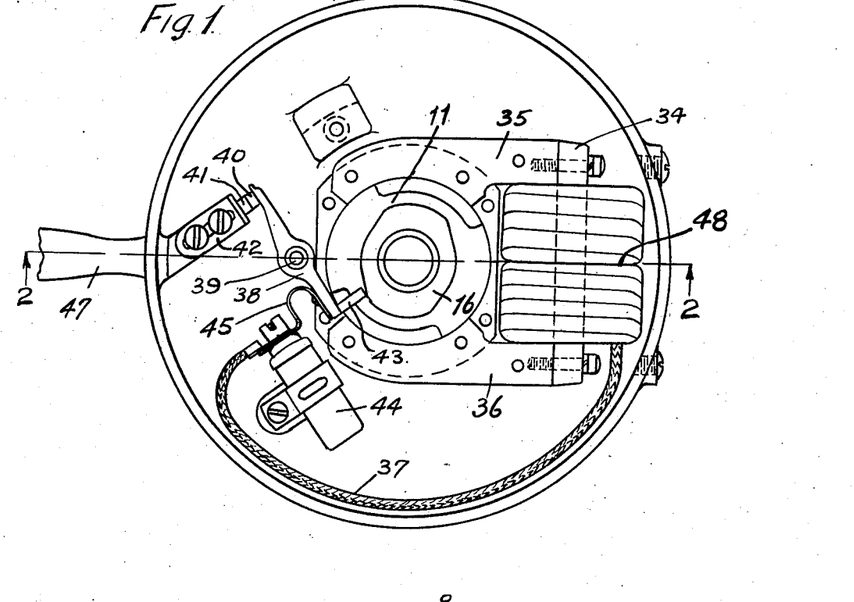
Figure 1 is a view on the line 1—1 of Figure 2, showing a circuit breaker cam and current-generating structure, the cam being shown in a position about to open the circuit breaker.

Mounted on the lower part 30 of the housing, is a current generating structure composed of a current generating coil having a primary winding 32 and a high-tension winding 33, both carried on a core 34 which has pole pieces 35 and 36 which extend into operative relationship with the magnet 11. The primary winding 32 is connected by a conductor 37 to a movable member 38 of a circuit breaker. The member 38 is insulatingly mounted on a stud 39 and has a contact 40 adapted to cooperate with the contact 41 on an adjustable stationary grounded member 42. The breaker member 38 carries a cam-engaging member 43. A condenser 44 is bridged across the contacts 40 and 41 in the usual manner. As shown, the connection between the cable 37 and the movable member 38 is completed by a spring 45 joined to the cable 37 at the one terminal of the condenser. The flywheel 2 is provided with a knob or handle 46 for the purpose of cranking the engine which is done merely by turning the flywheel through the medium of the handle or knob 46, it being understood that the spark advance lever 47 is set in proper position for starting.

The operation of the structure will be readily understood as the driving connection between the engine shaft 6 and the rotary elements of the magneto is completed through the impulse coupling and associated parts as have been described. However, it may be noted that the drive member 3 has downwardly extending flange portions 82 and 83 forming cams which, as will be seen by reference to Figure 3, engage the pawls 21 and 22 respectively, as the driving member is rotated right-handed, to release them from engagement with the stop member 27, thus allowing the impulse to take place. As soon as the engine fires, the flyweights 21 and 22 are moved by centrifugal force out of the path of the stop member 27, and the entire drive between the engine shaft and magneto is through the impulse spring 4 having the necessary operating characteristics. If necessary, a positive lock may be used between the driving and driven members somewhat as shown in Nowosielski Patent 1,582,422, issued April 27, 1926.

Figure 3:
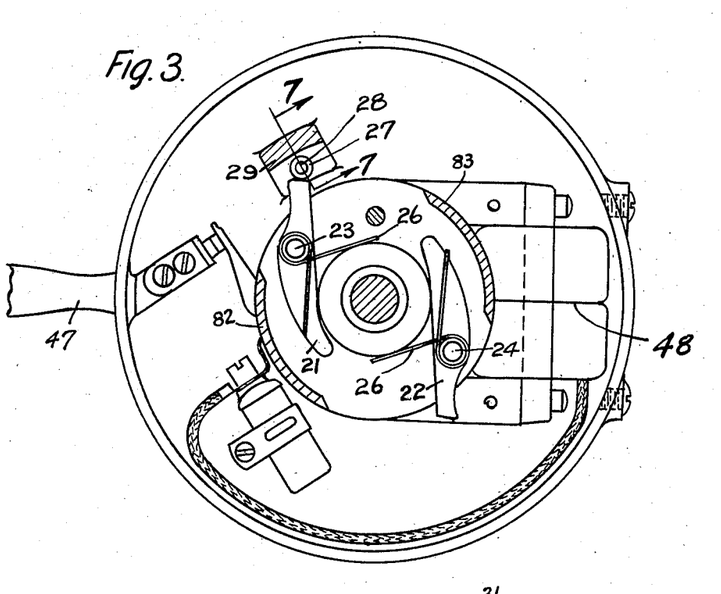
Figure 3 is a view on the line 3—3 of Figure 2 with one of the stop pawls in holding position.

In Figures 1, 2 and 3 I have illustrated a structure for a two-cylinder, two-cycle engine which utilizes a two-nose cam and two independent coils separated at the line 48. For a one-cylinder engine only one cam nose and one coil are needed.

Figure 8:
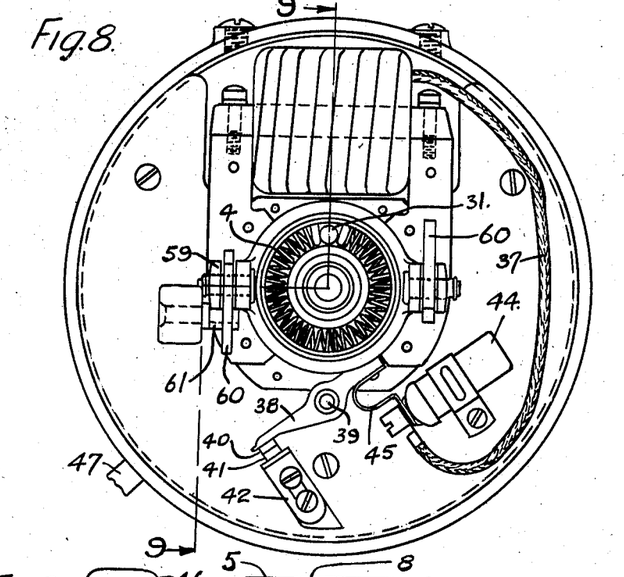
Figure 8 is a part-sectional and part-plan view taken below the flywheel cover such as shown in Figure 2, but of a slightly modified form of construction.
Figure 9:
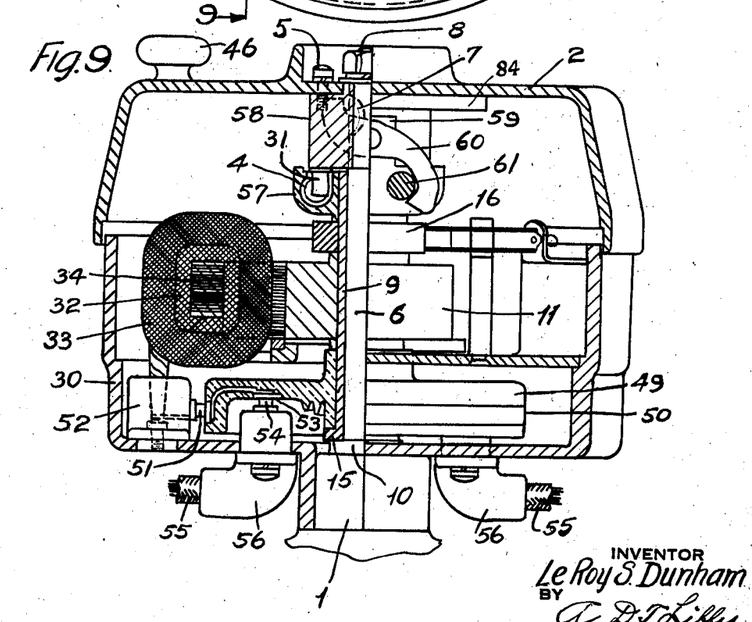
Figure 9 is a part-sectional and part-elevational view on the line 9—9 of Figure 8.

In Figures 8 and 9, the same type of sleeve 9 is used, but the magnet 11 is mounted somewhat higher thereon, a distributor disc 49 being interposed between the magnet and the flange 15 on the sleeve 9. The disc 49 carries an annular ring 50 for picking up current from a brush 51 carried by a supporting insulator 52 through which connection is made from the high-tension winding 33 of the current generating coil. The distributor disc 49 is provided with contacts 53 located at properly arcuately spaced points in accordance with the requirements of the engine to be fired, current being taken off these contacts by brush members 54 connecting with cables 55 leading to the spark plugs, which cables are supported by insulating members 56 fastened to the lower casing member 30. Figures 8 and 9 also illustrate an alternate form of impulse coupling construction wherein the spring 4 is carried in a member 57 which is fastened to the sleeve 9. The driving member 58 carries the driving pin 31. The driven member 57 has upwardly projecting hubs 59 on which are supported the flyweight pawls 60 which are so positioned as to drop by gravity into impulsing position to engage a stop pin 61. The pawls are released from engagement from the pin 61 by reason of their upper ends engaging cams, part of one, 84, being shown in Figure 9.

The construction of Figures 8 and 9 can be adapted for use in a multi-cylinder engine of either the two or four-cycle type, depending on the number of poles on the magnet 11 and the number of lobes on the cam 16, and the necessary distributor contacts on the distributor 49.

Figures 4, 6, 7:
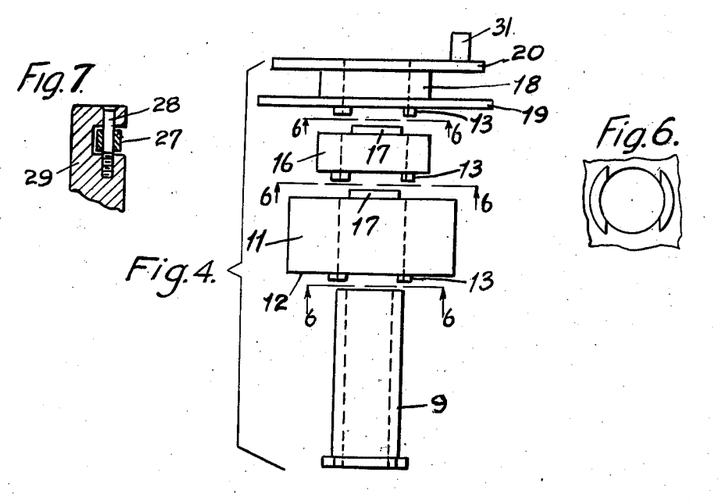
Figure 4 is an expanded view showing certain of the parts entering into the construction of the driven member of the impulsing mechanism.
Figure 6 illustrates the method of drive between the different parts shown in Figure 4, the driving connection between the parts being the same as shown in Figure 4.
Figure 7 is a partial section on the line 7—7 of Figure 3.
Figure 5:
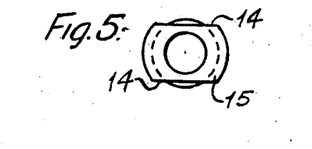
Figure 5 is an end view of the lower portion of Figure 4.
Figure 10:
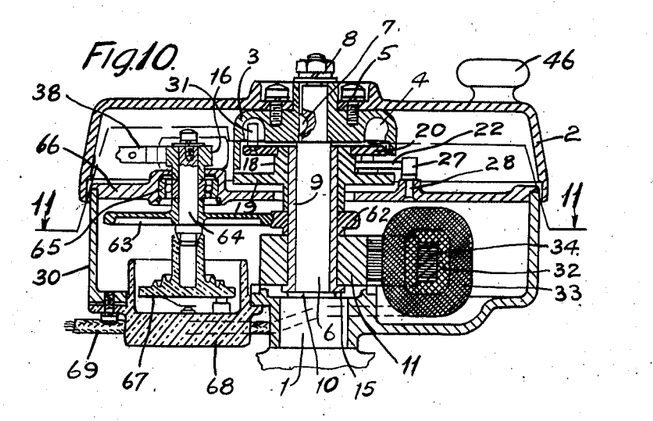
Figure 10 is a sectional view similar to Figure 2, but showing a further modified form of construction.
Figure 11:
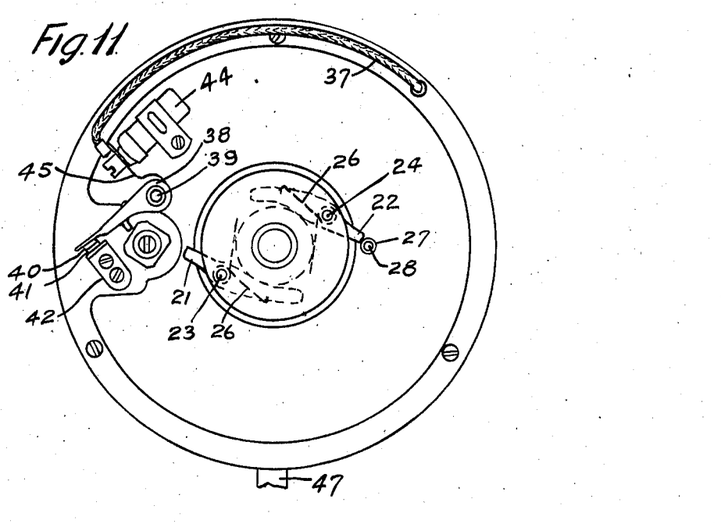
Figure 11 is a view on the line 11—11 of Figure 10.

In Figures 10 and 11, the sleeve 9 carries the magnet 11 in the same manner as in Figure 2. Drivingly connected therewith, in the same manner as shown in Figure 4, is a pinion 62 which is adapted to mesh with a distributor gear 63 operatively mounted on a stub shaft 64 that is carried by a bearing 65 mounted in a bearing plate 66. On the upper end of the stub shaft 64, the cam 16 is mounted for cooperation with a movable breaker member 38. On the lower end of the stub shaft 64 is mounted a distributor disc 67 which cooperates with contacts carried in a distributor block 68 in the usual manner, from which block current is led by suitable conductors 69 to the different spark plugs.

The construction of Figures 10 and 11 may also be adapted for use on a multi-cylinder engine of the two or four-cycle type, depending on the gear ratio, magnet, cam and distributor details.

In the previous figures described, the magneto construction has been shown as adapted to a vertical type of engine drive shaft, such as is used in outboard motors, but the principles underlying my invention may also be applied to a driving shaft which is mounted horizontally as will now be described with respect to Figures 12 to 17 inclusive.

Figures 12, 13:
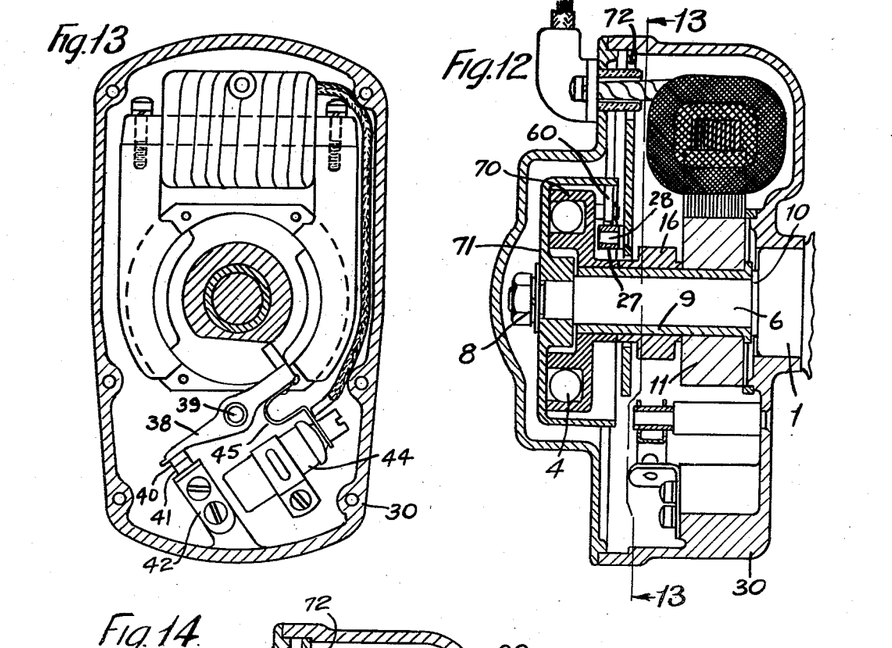
Figure 12 is a vertical sectional view through a further modified form of construction.
Figure 13 is a view on the lines 13—13 of Figure 12.

In Figure 12, the sleeve 9 carries a magnet 11 and cam 16, and an impulse-driven member 70, all drivingly connected one to the other and to the sleeve 9 as shown in Figure 4. The driving member 71 is fastened to the shaft end 6 by a nut and lock washer 8 as in Figure 2. The housing member 30, forming a part of the magneto as in Figure 2, carries a plate 72 to which the impulse stop pin or roller 27 is fastened by means of the stud 28. One of the flyweights 60 is indicated in the sectional view.

In the construction of Figure 12, the shaft 6 may be at one end of the crank shaft of the engine, or the cam shaft, or some shaft driven by either crank shaft or cam shaft. The constructions of Figures 12 and 13 are adapted for use on a single-cylinder engine.

Figure 14:
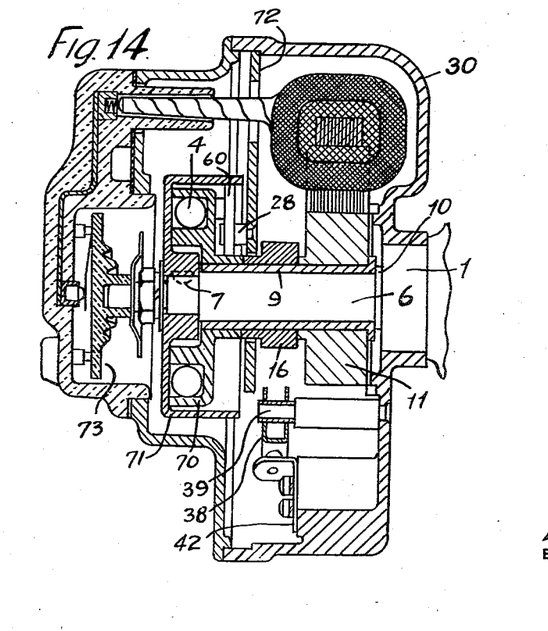
Figure 14 is a vertical sectional view of a still further modified form of construction.

In Figure 14 the construction is similar to that shown in Figures 12 and 13, except the outer end of the shaft 6 carries a distributor disc 73 so that the construction may be used with a multi-cylinder engine.

Figures 15, 16, 17:
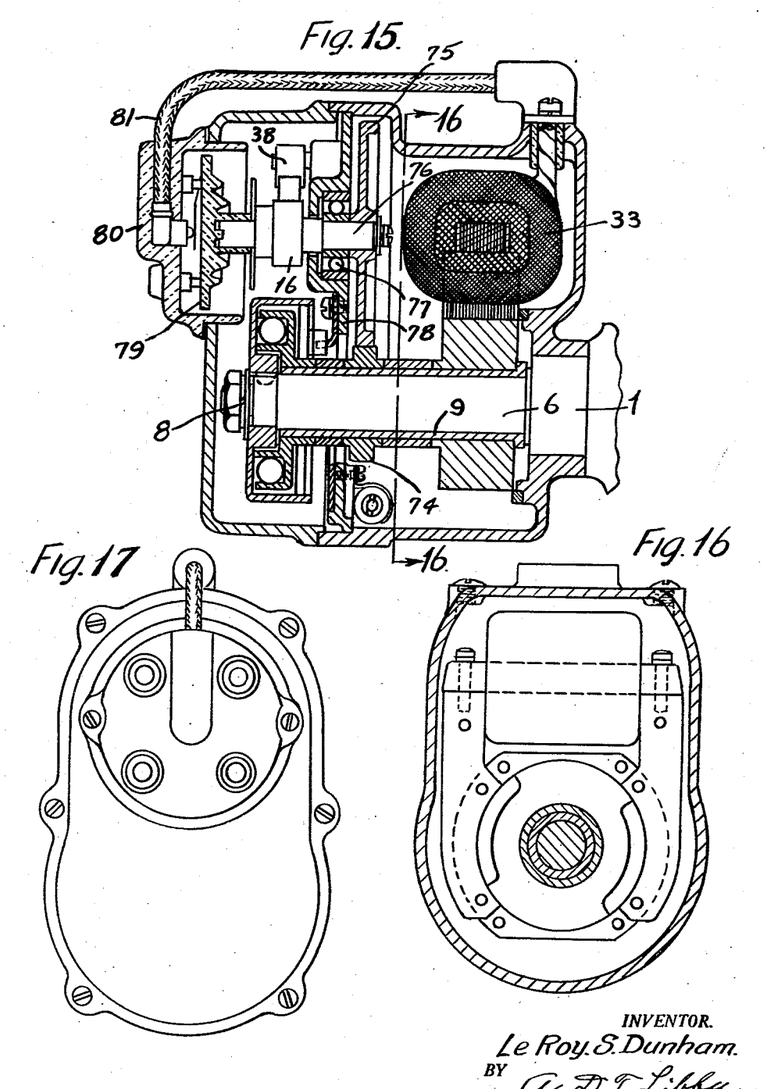
Figure 15 is a vertical sectional view of a still further modified form of construction.
Figure 16 is a section on the line 16—16 of Figure 15.
Figure 17 is an end view looking from left to right of Figure 15.

In Figures 15 to 17 inclusive, the construction of the sleeve and impulse-driven member is similar to that shown in Figure 12, except that in place of the cam 16 a pinion 74 is mounted on the sleeve 9. The pinion 74 is adapted to mesh with a distributor gear 75 carried on a stub shaft 76 supported by a bearing 77 which in turn is carried by a support plate 78. The stub shaft 76 carries a cam 16 for cooperation with the circuit breaker arm 38. On the outer end of the stub shaft 76 is carried a distributor disc 79 adapted to cooperate with contacts carried by the distributor block 80 to which the high-tension current is brought by a lead 81 from the high-tension winding 33 of the ignition coil.

In this form of construction, the shaft 6 may be the end of the engine cam shaft, it being understood that the magnet, breaker cam and distributor are arranged to fire a multi-cylinder engine. It is to be noted, however, that throughout all of the constructions heretofore described, the ignition system is built around a driven member comprising a sleeve carrying the magnet and a driven member of the impulse coupling, and in certain cases carrying the cam for operating the circuit breaker, while in other cases the cam is replaced by a pinion for operating the circuit breaker through an intermediate shaft.

While I have described certain parts of the driven member as being mounted on a sleeve, they may be mounted directly on the engine shaft, suitable driving connections being made from one to the other of the component parts, each of which may be provided with special bearing metals, antifriction bearings or the equivalent. Likewise, said sleeve, when used, may be equipped with special bearing metals or special bearings.

From what has been said, it will be readily understood by those skilled in this particular art that in the adaptation of the invention to engines of the two or four-cycle type and of different numbers of cylinders, the details for carrying my invention into practice may be varied over a considerable range without departing from the spirit of my invention or the scope of the appended claims.

What I claim is:

1. An ignition apparatus comprising support means, an ignition coil and core structure with field poles carried on a part of said support means, a circuit breaker for controlling the action of said coil also carried on a part of the support means, a rotor unit including; a sleeve adapted to be freely mounted on a driving shaft, a permanent magnet mounted on the sleeve in cooperative relationship with said field poles, a driven element of an impulse coupling and another device used in the ignition system, the magnet, the impulse element and said device all being drivingly mounted in fixed relation on the sleeve; and a driving element of the impulse coupling adapted to be fixedly mounted to rotate with said driving shaft in cooperative relationship with said driven member.

2. An ignition apparatus as set forth in claim 1, further characterized in that the parts carried on the sleeve have driving connections, one with the other, which are similarly constructed.

3. An ignition apparatus as set forth in claim 1, further characterized in that the parts carried on the sleeve have slidable driving connections, one with the other, whereby they may be readily assembled and disassembled.

4. An ignition apparatus as set forth in claim 1, further characterized in that said device is a cam for directly operating the circuit breaker.

5. An ignition apparatus as set forth in claim 1, further characterized in that said device is a pinion and the cam for operating the circuit breaker is carried on a stub shaft driven by a gear in mesh with said pinion, said stub shaft also carrying a current-distributing member in cooperative relationship with a distributor block to distribute the high-tension current delivered thereto by the ignition coil.

6. An ignition apparatus as set forth in claim 1, further characterized in that a flywheel is provided and the driving element of the impulse coupling is fastened to said shaft through the medium of the flywheel, with means on the flywheel for turning the same to cause the impulse coupling elements to impulse the sleeve and parts carried thereon.

7. An ignition apparatus as set forth in claim 1, further characterized in that a flywheel is provided and the driving element of the impulse coupling is fastened to said shaft through the medium of the flywheel which has a hand-engageable member for turning it for the purpose described.

8. In combination with an engine-operated shaft, a sleeve freely mounted on said shaft, said sleeve comprising the rotary part of an ignition apparatus and carrying at least a permanent magnet and the driven member of an impulse coupling, the driving member of which is fastened to rotate with said shaft, an ignition coil having primary and secondary windings with a core and field poles comprising part of said ignition apparatus mounted in cooperative relationship to said magnet, a circuit breaker controlling the primary of the coil, and a cam operated by said shaft for actuating the circuit breaker.

9. The combination as set forth in claim 8, further characterized in that for at least single and two-cylinder engines the shaft is vertical and carries a flywheel associated with the driving member of the impulse coupling, the flywheel having a hand-engageable member thereon for cranking the engine, and the circuit breaker cam is drivingly carried on said sleeve.

10. An ignition apparatus comprising a housing type support means and having an engine-operated shaft extending therewithin, an ignition coil and core structure with field poles carried on a part of said support means within the housing, a circuit breaker also carried on a part of the support means for controlling the action of the coil, a rotor unit around the engine-operated shaft within the housing so its parts have a rotation, under certain conditions of operation, different from the said shaft, the rotor unit including a permanent magnet in cooperative relationship with the said field poles, a driven element of an impulse coupling, and a device requisite to the actuation of said circuit breaker, all of said parts of the rotor unit being drivably connected and in fixed angular relationship to each other, a driving element of an impulse coupling fixedly mounted directly on and to rotate with the engine operated shaft, an impulsing spring operatively interposed between the driven and driving members of the impulse coupling, and means for automatically causing said spring to impulse the rotor unit at predetermined speeds of rotation of said engine shaft.

11. An ignition apparatus as set forth in claim 10, further characterized in that a sleeve is provided, and the magnet, the driven impulse element and the device requisite to the actuation of the circuit breaker are carried thereon.

12. An ignition apparatus as set forth in claim 10, further characterized in that the said rotor unit also includes a carrier sleeve on which the said unit parts are mounted, and further characterized in that a flywheel is provided and the driving element of the impulse coupling is fastened to said shaft through the medium of the flywheel, with means on the flywheel for turning the same to cause the impulse coupling elements to impulse the sleeve and parts carried thereon.

13. An ignition apparatus as set forth in claim 10, further characterized in that a flywheel is provided and the driving element of the impulse coupling is fastened to said shaft through the medium of the flywheel which has a hand-engageable member for turning it for the purpose described.

14. In combination with a housing an engine-operated shaft extending thereinto, a rotatable ignition generator rotor system within the housing and including a magnet operatively mounted on the shaft and turnable thereabout, a relatively stationary stator system also mounted within the housing and including an ignition coil positioned in cooperative relationship with the magnet of the rotor system, and angularly variable driving means carried by the shaft within the housing and connecting said shaft to said rotor system for normal operation thereof, with arresting and overtaking means for the accomplishment of predetermined periodic angular displacement of the said rotor system relative to the said shaft whereby appropriately timed ignition sparks of improved intensity are generated by the said coil.

15. The combination as set forth in claim 14, further characterized in that the ignition generator rotor system comprises at least a permanent magnet with poles, a device requisite to the actuation of a set of circuit breaker contacts, and a driven member of an impulsing device, all drivably connected, the stator system comprising, with the ignition coil, a core for the coil, a field pole structure cooperative between the magnet and the coil core, and a support carrying said breaker contacts actuated from the rotor system for the control of the coil, the shaft carrying a driving member which is also a part of the driving means, and the angularly variable driving means includes an impulsing spring operatively interposed between said driven member and said driving member.

16. An ignition apparatus as set forth in claim 14, further characterized in that the arresting means include at least one flyweight pawl pivotally mounted in a vertical plane in operative connection with a member of said rotor system which is positioned in a horizontal plane to periodically arrest the same at the time of starting or at slow rotative speeds of said shaft for the purpose described.

17. In combination, an engine housing, a shaft of the engine located at least in part therein, an ignition system carried within the housing, said system including primary and secondary relatively stationary and rotary parts, the stationary primary parts including an ignition coil with primary and secondary windings thereon, a core structure for the coil and a circuit breaker for controlling the action of the coil primary; the rotary part of the ignition system primary including, a permanent magnet located in operative relation to the core structure, a driven element of an impulse coupling, and a device requisite to the actuation of the circuit breaker, these said rotary parts of the primary system being interconnected and mounted on said engine shaft so as to be held and angularly displaced with respect thereto, means for holding said primary rotary parts from rotation, and means for releasing the same after a predetermined angular movement of a driving element, a driving element of the impulse coupling fixed to said shaft within the housing and in cooperative relation with its driven element, impulsing means cooperative between said impulse elements to produce a quick advancement of said primary rotor parts after being released following a holding period; the secondary rotary parts of the ignition system including a distributor disc within the housing and cooperatively connected to the secondary of the coil means for driving the distributor device from said shaft, and means for picking up the ignition current from said disc.

LE ROY S. DUNHAM.